United States Patent Office

2,830,008
Patented Apr. 8, 1958

2,830,008

AMINES

Harry James Barber, Gidea Park, Raymond Frederick Collins, Harold Wood, and Michael Davis, Upminster, England, assignors to May & Baker Limited, Dagenham, England, a British company No Drawing. Application March 26, 1956
Serial No. 573,656

Claims priority, application Great Britain April 30, 1954

10 Claims. (Cl. 167—65)

This invention is for improvements in or relating to amines and to processes for their preparation and has for its object the provision of new, therapeutically active substances. This application is a continuation-in-part of application Serial No. 503,820, filed April 25, 1955.

The new substances of the present invention are the compounds represented by the general formula:

wherein $R_1$ and $R_2$ are each selected from hydrogen, lower alkyl, hydroxyalkyl polyhydroxyalkyl and alkoxyalkyl, A is selected from unbranched saturated and ethylenically unsaturated hydrocarbon chains containing not less than five and not more than nine carbon atoms and R is selected from groupings of the formulae:

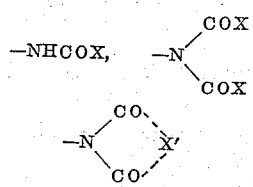

where X is selected from the class consisting of monocyclic and dicyclic aromatic nuclei and such aromatic nuclei containing lower alkyl, lower alkoxy, carboxy, alkoxycarbonyl, carbamoyl, N-substituted carbamoyl and carboxylic acylamido substituents; alkyl and alkenyl groups of not more than 3 carbon atoms and said alkyl and alkenyl groups containing phenyl, phenoxy, amino, acylamido and carbamoyl substituents; and heterocyclic groups, and where X' is selected from the class consisting of groups of the formula —YZ— where Y is selected from the class consisting of a single bond, an oxygen atom and a —CH$_2$— group and Z is an ortho-linked benzene ring; 1:2-linked alicyclic rings; aliphatic chains of at most 3 carbon atoms and such aliphatic chains substituted in one or more positions by lower alkyl groups. The term "lower" is to be understood to mean that the group referred to contains at most 4 carbon atoms.

The new substances may be prepared and used in the form of their acid addition salts, and such salts are within the scope of the present invention. Also within the scope of the present invention are amine derivatives such as those commonly used in pharmaceutical practice, such as formaldehyde bisulphite addition products.

The said new compounds have been found to possess valuable therapeutic properties, particularly in the treatment of bilharziasis. Compounds which, together with their acid addition salts containing pharmaceutically acceptable anions, are of outstanding therapeutic value are those represented by the aforesaid general formula when $R_1$ and $R_2$ are the same or different and represent hydrogen atoms or methyl, ethyl, propyl, hydroxyethyl or hydroxypropyl groups, A is a polymethylene chain of 5 to 8 carbon atoms and R represents a phthalimido, hippuramido or benzamido group or, less preferably, a succinimido, o-, m- or p-methoxybenzamido, 1-naphthoylamino, acetamido or 2-thenoylamino group. Individual such compounds of particular importance are: 1-p-aminophenoxy - 5 - phthalimidopentane, 1 - p - aminophenoxy-6 - phthalimidohexane, 1 - p - aminophenoxy - 7 - phthalimidoheptane, 1 - p - aminophenoxy - 8 - phthacimidooctane, 1 - p - aminophenoxy - 5 - benzamidopentane, 1-p - aminophenoxy - 8 - benzamidooctane and 1 - p-aminophenoxy-5-hippuramidopentane.

In accordance with a feature of the present invention, the said new compounds may be prepared by the condensation of a compound of the formula

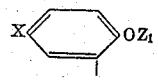

with a compound of the formula $Z_2Y$ wherein X represents a tertiary amino group or an atom or group capable of being replaced by or converted into a primary, secondary or tertiary amino group, Y represents the group R or an atom (e. g. a halogen atom) or group which can be replaced by or converted into the group R and $Z_1$ and $Z_2$ are atoms or groups capable of reacting together to produce the —O—A'— linkage in which A' represents the group A or a corresponding less saturated hydrocarbon linkage. If necessary the groups X and Y are then converted into the groups $NR_1R_2$ and R respectively and, also if necessary, the group A' is reduced to form the group A.

Among the groups which may be represented by X are:

(a) Groups convertible into primary amino groups: acylamido, carbonamido, nitro, nitroso, alkoxycarbonylamido, anil and arylazo groups;

(b) Groups convertible into secondary amino groups: anil, alkoxycarbonylamido and acylamido groups (by reduction) and acylalkylamido groups (by hydrolysis); and (c) Tertiary amino groups or groups convertible into tertiary amino groups in the form of quaternary ammonium groups (by pyrolysis) and acylalkylamido groups (by reduction).

Examples of groups which may be represented by Y are:

(a) Acetamido, benzamido, diacetamido, succinimido and phthalimido groups. One acylamido group may be converted into another by hydrolysis (or in the case of the phthalimido group by treatment with hydrazine) and subsequent carboxy-acylation; and (b) A nitro group which may be converted by reduction and subsequent carboxy-acylation.

Examples of groups which may be represented by $Z_1$ and $Z_2$ are hydrogen and alkali metal atoms and the groups Q—A'— where Q represents the radical of a reactive ester such as a methanesulphonate radical or a halogen atom.

In addition, compounds of the foregoing general formula and containing primary or secondary amino groups may be converted into products containing more highly substituted amino groups by known methods. For example, a product containing a primary amino group may be reacted with an alkylating agent or alkylene oxide.

It is not, of course, necessary that X when not identical to $NR_1R_2$ shall be convertible or replaceable thereby in a single step. Thus, if X represents a hydrogen atom the resulting condensation product may first be nitrated (by means of nitric acid) whereafter the nitro group is reduced to amino and, if required, the resultant amine is alkylated. The same considerations apply to the radical Y.

It will be apparent to those skilled in the art that the particular reaction and the sequence of reactions will in many cases be determined by the values desired for R, $R_1$ and $R_2$ and by the appropriate value selected for the groups X and Y. The methods employed for carrying out the various steps in the processes of the present invention are known per se and have been previously described in the literature.

The present invention includes within its scope pharmaceutical preparations containing one or more compounds of the aforesaid general formula or an acid addition salt or other simple derivative thereof for use in the treatment of bilharziasis in which the active material is associated with a pharmaceutical carrier which may be either a solid material or liquid. The compositions may take the form of elixirs or of tablets, powders, capsules, or other dosage forms which are particularly suitable for oral ingestion. Liquid diluents are employed in sterile condition for parenteral use, that is, by injection. Such a medium may be a sterile liquid such as water. The compositions of the invention may take the form of active material, admixed with solid diluents and/or excipients such as starch, lactose, talc, stearic acid, magnesium stearate, gums or the like. Any of the tabletting materials used in pharmaceutical practice may be employed where there is no possibility of incompatibility with the active terapeutic agent. Alternatively, the active therapeutic agent may, with or without its adjuvant material, be placed in the usual capsule or resorbable material such as the usual gelatine capsule and administered in that form.

The invention is illustrated in the following non-limiting examples:

Example I (a) An intimate mixture of 5-p-nitrophenoxypentyl bromide (6.0 g.) and potassium phthalimide (4.2 g.) was heated at 180° C. for 6 hours, cooled and extracted with warm chloroform, which was then washed with dilute sodium hydroxide and water, dried and evaporated. Crystallisation of the residue from ethanol gave 1-p-nitrophenoxy-5-phthalimidepentane, M. P. 123° C.

Similarly prepared was:

1-p-nitrophenoxy-5-succinimidopentane, M.P. 104–105° C., which when reduced catalytically as described in Example I (b) gave 1-p-aminophenoxy-5-succinimidopentane, M. P. 125–127° C.

(b) A mixture of 5-phthalimidepentyl bromide (Drake and Garman, J. Amer. Chem. Soc., 1949, 71, 2426) (296 g.) and potassium p-nitrophenoxide (177 g.) in ethanol (1.5 l.) was stirred mechanically, boiled under reflux for 20 hours, concentrated to half its volume, cooled and filtered. The product was washed with water, dried and crystallised from acetone, giving 1-p-nitrophenoxy-5-phthalimidopentane, M.P. 123–124° C. The foregoing nitro compound (100 g.) in ethanol (1 l.) was reduced by hydrogen over 2% of platinum oxide at 74° C./73 lb. per sq. in. until the equivalent of 6 atoms of hydrogen had been taken up. The filtered solution on cooling gave 1-p-aminophenoxy-5-phthalimidopentane, which after recrystallisation from ethanol had M. P. 113–114° C. The methanesulphonate had M. P. 203–205° C.

Similarly prepared were:
1-p-nitrophenoxy-6-phthalimidohexane, M. P. 131° C. (from 6-phthalimidohexyl bromide, M. P. 57–58° C.)
1-p-aminophenoxy-6-phthalimidohexane, M. P. 120° C.
1-p-nitrophenoxy-7-phthalimidoheptane, M. P. 132–134° C. from 7-phthalimidoheptyl bromide, not obtained crystalline).
1-p-aminophenoxy-7-phthalimidoheptane, M. P. 107–109° C.
1-p-nitrophenoxy-8-phthalimido-octane, M. P. 115–116° C. (from 8-phthalimide-octyl bromide, M. P. 51° C.)
1-p-aminophenoxy-8-phthalimido-octane, M. P. 101–102° C.
1-p-nitrophenoxy-9-phthalimidononane, M. P. 113–115° C. (from 9-phthalimidononyl bromide, not obtained crystalline)
1-p-aminophenoxy-9-phthalimidononane, M. P. 85–86° C.

Example II

A mixture of 1-p-aminophenoxy-5-phthalimidopentane (10 g.), prepared as described in Example I(b), ethylene chlorohydrin (15 ml.) and calcium carbonate (10 g.) in water (50 ml.) was refluxed for 20 hours, cooled, diluted with chloroform and filtered. The chloroform solution was washed, dried, concentrated to low bulk and diluted with ether. The product was filtered off and crystallised from ethanol, giving 1-p-di(2-hydroxyethyl)-aminophenoxy-5-phthalimidopentane, M. P. 100–105° C.

Similarly prepared was:
1-p-di(2-hydroxyethyl)aminophenoxy-5-benzamidopentane, M. P. 99–102° C.

Example III

A mixture of 1-p-nitrophenoxy-5-phthalimidopentane (38 g.) prepared as described in Example I(a), and hydrazine hydrate (80%: 25 ml.) in ethanol (300 ml.) was refluxed for 1½ hours, concentrated under reduced pressure, and the residue was heated for 1 hour at 100° C. with concentrated hydrochloric acid (80 ml.) and water (80 ml.), cooled and filtered. The solid was washed with dilute hydrochloric acid and the combined acid filtrates were basified and extracted with chloroform, which was then washed, dried and evaporated. The residue, crude 1-p-nitrophenoxy-5-aminopentane, in pyridine (50 ml.), was treated with acetic anhydride (13 ml.) and kept for 3 days at room temperature. Water was added and the product was filtered off, washed and crystallised from ethanol, giving 5-acetamido-1-p-nitrophenoxypentane, M. P. 104–105° C. The nitro compound (26 g.) in alcohol (200 ml.) was reduced catalytically as described in Example I(a) and the product was crystallised from ethanol, giving 5-acetamido-1-p-aminophenoxypentane, M. P. 83–85° C.

Similarly prepared, using 1-p-nitrophenoxy-5-aminopentane or:

1-p-nitrophenoxy-8-aminooctane with the appropriate chloride or anhydride were:
1-p-nitrophenoxy-5-benzamidopentane, M. P. 132–133° C.
1-p-aminophenoxy-5-benzamidopentane, M. P. 121–123° C. (the methanesulphonate had M. P. 212–215° C.)
1-p-nitrophenoxy-8-benzamido-octane, M. P. 100° C.
1-p-aminophenoxy-8-benzamido-octane, M. P. 81–82° C.
1-p-nitrophenoxy-5-o-methoxybenzamidopentane, M. P. 90–93° C.
1-p-aminophenoxy-5-o-methoxybenzamidopentane, M. P. 107–110° C.
1-p-nitrophenoxy-5-m-methoxybenzamidopentane, M. P. 100–102° C.
1-p-aminophenoxy-5-m-methoxybenzamidopentane, M. P. 84–86° C.
1-p-nitrophenoxy-5-p-methoxybenzamidopentane, M. P. 134–136° C.
1-p-aminophenoxy-5-p-methoxybenzamidopentane, M. P. 120–121° C.
1-p-nitrophenoxy-5-p-chlorobenzamidopentane, M. P. 133–134° C.
1-p-aminophenoxy-5-p-chlorobenzamidopentane, M. P. 120° C.
1-p-nitrophenoxy-5-phenylacetamidopentane, M. P. 96–98° C.
1-p-aminophenoxy-5-phenylacetamidopentane, M. P. 74–77° C. (the methanesulphonate had M. P. 168–170° C.)
1-p-nitrophenoxy-5-phenoxyacetamidopentane, M. P. 101–102° C.
1-p-aminophenoxy-5-phenoxyacetamidopentane, M. P. 88–90° C.
1-p-nitrophenoxy-5-p-chlorophenoxyacetamidopentane, M. P. 101–104° C.
1-p-aminophenoxy-5-p-chlorophenoxyacetamidopentane, M. P. 112–113° C.

1-p-nitrophenoxy-5-1'-naphthoylaminopentane, M. P. 117–119° C.

1-p-aminophenoxy-5-1'-naphthoylaminopentane, M. P. 89–91° C.

1-p-nitrophenoxy-5-nicotinamidopentane, M. P. 130–131° C.

1-p-aminophenoxy-5-nicotinamidopentane, M. P. 98–100° C.

1-p-nitrophenoxy-5-isonicotinamidopentane, M. P. 108–110° C.

1-p-aminophenoxy-5-isonicotinamidopentane, M. P. 121–122° C.

*Example IV*

A mixture of 1-p-aminophenoxy-5-phthalimidopentane (3.24 g.), anhydrous sodium carbonate (1.06 g.) and methyl iodide (5 ml.) in ethanol (35 ml.) was refluxed for 3 hours, then cooled and filtered. Recrystallisation of the solid from water gave 1-p-dimethylaminophenoxy-5-phthalimidopentane methiodide, M. P. 193–196° C. (efferv.). This quaternary salt (3.4 g.) was heated over a free flame at 15 mm. until no more methyl iodide was evolved. Crystallisation of the residue from ethanol gave 1-p-dimethylaminophenoxy-5-phthalimidopentane, M. P. 103–105° C.

Similarly prepared were:

1-p-dimethylaminophenoxy-5-benzamidopentane methiodide, M. P. 196–200° C. and
1-p-dimethylaminophenoxy-5-benzamidopentane, M. P. 92–93° C.

*Example V*

A mixture of p-methylaminophenol sulphate (86 g.), formamide (26 g.) and potassium acetate (49 g.) in acetic acid (200 ml.) was refluxed for 4 hours, then filtered, and the filtrate was concentrated by distillation. Addition of water to the residue gave N-formyl-p-methylaminophenol which, after recrystallisation from aqueous ethanol, had M. P. 105–106° C.

N-formyl-p-methylaminophenol (24.6 g.) and 5-phthalimidopentyl bromide (59.2 g.) were added to a solution of sodium (4.6 g.) in ethanol (100 ml.). The mixture was refluxed for 20 hours, concentrated by distillation, cooled and diluted with water. Recrystallisation from ethanol of the precipitate which separated gave N-formyl-1-p-methylamino-phenoxy-5-phthalimidopentane, M. P. 104–107° C. A mixture of the foregoing N-formyl compound (36.1 g.), 2.06 N-hydrochloric acid (48 ml.), water (50 ml.) and ethanol (200 ml.) was refluxed for 20 hours, then concentrated to half its volume and neutralised with sodium bicarbonate. The solid which separated was recrystallised from ethanol, giving 1-p-methylaminophenoxy-5-phthalimidopentane, M. P. 110–112° C.

*Example VI*

A mixture of 1-p-nitrophenoxy-5-aminopentane (24.65 g.) and acetic anhydride (150 ml.) was refluxed for 20 hours, then evaporated in vacuo. The residue was recrystallised from acetone-light petroleum and ethanol, yielding 1-p-nitrophenoxy-5-diacetamidopentane, M. P. 73–74° C.

The nitro compound (24.7 g.) thus obtained in ethanol (350 ml.) was reduced catalytically giving 1-p-aminophenoxy-5-diacetamidopentane which, after recrystallisation from ethyl acetate, had M. P. 147–149° C.

*Example VII*

1-p-nitrophenoxy-5-phthalimidopentane (100 g.) in ethanol (700 ml.) was reduced over platinum oxide (2%) at 96° C. and 360 lb. per. sq. in. until the equivalent of 12 atoms of hydrogen had been taken up. The filtered solution was cooled and the crystalline product which separated was recrystallised from ethanol giving 1-p-aminophenoxy-5-hexahydrophthalimidopentane, M. P. 113–115° C. The benzylidene derivative had M. P. 86–87° C.

*Example VIII*

1-p-aminophenoxy-5-phthalimidopentane (16.2 g.) was heated with 0.5 N sodium hydroxide (100 ml.) for 15 minutes at 100° C. N hydrochloric acid (50 ml.) was added to the filtered solution and the 1-p-aminophenoxy-5-o-carboxybenzamidopentane, which separated, was filtered off, washed with water, and dried at room temperature over phosphorus pentoxide in vacuo. It had M. P. 137–139° C. The lithium salt had M. P. 179–183° C.; the calcium salt formed a trihydrate which partially melted at 102–106° C. then slowly melted above 135° C.

*Example IX*

A mixture of 1-p-aminophenoxy-5-benzamidopentane (22.6 g.) and sodium formaldehydebisulphite (15.2 g.) in water (250 ml.) was boiled under reflux for 15 minutes, then immediately filtered through Hyflo Supercel. The filtrate on cooling gave the sodium formaldehydebisulphite of 1-p-aminophenoxy-5-benzamidopentane. It was filtered off, washed with water, ethanol, acetone and ether, and dried. It had M. P. 208–214° C.

*Example X*

Phthaloyl chloride (2.03 g.) was added to a solution of 1-p-nitrophenoxy-5-aminopentane (4.48 g.) in pyridine (10 ml.), which was then kept for 20 hours at room temperature. Water was added and the solid which separated was filtered off, washed with water and recrystallised from ethanol and from chloroform-ether, giving 1:2-di-[N-(5-p-nitrophenoxypentyl)carbamoyl] benzene, M. P. 130–132° C.

A solution of this nitro compound (1.65 g.) in ethanol (50 ml.) was reduced catalytically. The filtered solution on cooling deposited 1:2-di-[N-(5-p-aminophenoxypentyl)carbamoyl]benzene which, after purification by chromatography in chloroform (over alumina) and recrystallisation from ethanol, had M. P. 148–150° C. The picrate had M. P. 189–191° C. (decomp.).

*Example XI*

A mixture of 1-p-aminophenoxy-5-benzamidopentane (1 g.), 2-methoxyethyl chloride (0.5 g.), calcium carbonate (1 g.) and water (30 ml.) was boiled under reflux for 20 hours, cooled, diluted with chloroform and filtered. The chloroform layer was separated, dried and concentrated and the residue was purified by chromatography in chloroform-benzene (over alumina) and recrystallisation from chloroform-light petroleum (B. P. 40–60° C.), giving 1-p-(2-methoxyethylamino)phenoxy-5-benzamidopentane, M. P. 75° C. Similarly prepared was 1-p-(2-methoxyethylamino)phenoxy-5-phthalimidopentane, M. P. 67–68.5° C.

*Example XII*

A solution of 1-p-aminophenoxy-5-benzamidopentane (1 g.) and propylene oxide (1 ml.) in ethanol (10 ml.) was refluxed for 20 hours, then evaporated. The residue was chromatographed in chloroform-benzene and the product recrystallised from acetone-light petroleum (B. P. 40–60° C.), giving 1-p-di(2-hydroxypropylamino)-phenoxy-5-benzamidopentane, M. P. 82–84° C.

*Example XIII*

A solution of 1-p-aminophenoxy-5-benzamidopentane (1.49 g.) and DL-glycidol (0.814 g.) in ethanol (10 ml.) was refluxed for 20 hours, cooled and diluted with light petroleum (B. P. 40–60° C.). The oil which initially separated crystallised on trituration with ethyl acetate and ether. Recrystallisation from ethyl acetate gave 1-p-di-(2:3-dihydroxypropyl)aminophenoxy-5-benzamidopentane, M. P. 101–104° C. (softens 88° C.).

Example XIV p-Benzylideneaminophenol (3.94 g.) and 5-phthalimidopentyl bromide (5.92 g.) were added to a solution of sodium (0.46 g.) in ethanol (25 ml.) and the mixture was refluxed for 20 hours, cooled and filtered. The solid was washed with alcohol and water, dried and recrystallised from toluene and acetone, giving 1-p-benzylideneaminophenoxy-5-phthalimidopentane, M. P. 142–144° C. A mixture of this benzylidene derivative (4.0 g.) and N hydrochloric acid (9.7 ml.) in water (100 ml.) was steam distilled until no more benzaldehyde was evolved. The hot aqueous solution was filtered from a small amount of tar, treated with excess sodium bicarbonate, and the base was filtered off, washed, and recrystallised from ethanol giving 1-p-aminophenoxy-5-phthalimidopentane, M. P. 115–115.5° C.

Example XV p-Acetamidophenol (7.55 g.) and 5-phthalimidopentyl bromide (14.8 g.) were added to a solution of sodium (1.15 g.) in ethanol (50 ml.) and the mixture was refluxed for 20 hours, diluted with water, cooled and filtered. Recrystallisation of the solid from ethanol gave 1-p-acetamidophenoxy-5-phthalimidopentane, M. P. 176–179° C.

A mixture of the foregoing acetyl derivative (3.66 g.), 2.06 N hydrochloric acid (4.85 ml.) and ethanol (15 ml.) was refluxed for 20 hours, diluted with water and treated with excess sodium bicarbonate. The base, which separated, was filtered off and recrystallised from ethanol, giving 1-p-aminophenoxy-5-phthalimidopentane, M. P. 112–114° C.

Example XVI

A mixture of p-hydroxyphenyltrimethylammonium iodide (5.58 g.), anhydrous sodium carbonate (2.12 g.) and 5-phthalimidopentyl bromide (5.92 g.) in ethanol (50 ml.) was refluxed for 20 hours, cooled and filtered. The solid was washed with ether, dissolved in hot dilute acetic acid, treated with sodium iodide, and cooled. The solid which crystallised out was filtered off and recrystallised from water, giving 1-p-dimethylaminophenoxy-5-phthalimidopentane methiodide, M. P. 194–196° C. Pyrolysis of this quaternary salt, as described in Example IV, yielded 1-p-dimethylaminophenoxy-5-phthalimidopentane, M. P. 102–104° C.

Example XVII

Nitric acid (d, 1.51; 3 ml.) was added dropwise to a mixture of 1-phenoxy-5-phthalimidopentane (3 g.) prepared from 5-phthalimidopentyl bromide and sodium phenoxide as described in Example I(b)., M. P. 72–73° C. and acetic acid (30 ml.). The mixture was heated at 50° C. for 30 minutes, poured into water and the gum which separated was crystallised twice from acetic acid, giving 1-p-nitrophenoxy-5-phthalimidopentane, M. P. 122–122° C.

Example XVIII

A mixture of 1:5-dimethanesulphonyloxypentane (100 g.), potassium phthalimide (50 g.) and dry acetone (600 ml.) was refluxed for 5 hours, cooled and filtered. The filtrate was evaporated and the residue distilled, giving 1-methanesulphonyloxy-5-phthalimidopentane, B. P. 200–220° C./0.07 mm.

A mixture of this monoester (3.7 g.), potassium p-nitrophenoxide (2.5 g.) and ethanol (70 ml.) was refluxed for 2 hours and filtered hot. The filtrate was diluted with water, cooled and filtered. The solid was recrystallised from ethanol giving 1-p-nitrophenoxy-5-phthalimidopentane, M. P. 122–123° C.

Example XIX

A solution of 1-p-aminophenoxy-5-benzamidopentane (1.6 g.) and DL-glycidol (0.437 g.) in ethanol (10 ml.) was refluxed 20 hours, then evaporated. The residue was triturated with ether and the solid was filtered and crystallised successively from chloroform and ethyl acetate, giving 1-p-(2:3-dihydroxypropyl)aminophenoxy-5-benzamidopentane, M. P. 118–119° C.

Example XX

A mixture of 1-p-aminophenoxy-5-benzamidopentane (1.49 g.), n-propyl bromide (2.8 g.) and sodium carbonate (0.53 g.) in ethanol (10 ml.) was refluxed for 4 hours, cooled and filtered. The filtrate was evaporated and the residual oil was triturated with ether and filtered. Recrystallisation of the solid from chloroform-light petroleum (B. P. 40–60° C.) and then from aqueous ethanol gave 1-p-n-propylaminophenoxy-5-benzamidopentane, M. P. 88–90° C.

Example XXI 1-p-nitrophenoxy-5-2'-furoylaminopentane (M. P. 112–114° C., prepared in a manner similar to that described in Example III) (27.2 g.) was slowly added to a boiling solution of sodium sulphide nonahydrate (125 g.) in ethanol (200 ml.). The mixture was refluxed for 30 minutes, then poured into water. The product was filtered off, dissolved in warm dilute methanesulphonic acid and filtered (using charcoal), and the filtrate was made alkaline. The base was filtered off, washed with water, and recrystallised from aqueous ethanol, giving 1-p-amino-phenoxy-5-2'-furoylaminopentane, M. P. 118–119° C.

The following compounds were prepared in a similar manner:

1-p-nitrophenoxy-5-2'-thenoylaminopentane, M. P. 129–131° C.

1-p-aminophenoxy-5-2'-thenoylaminopentane, M. P. 115–116° C.

1-p-nitrophenoxy-5-cinnamoylaminopentane, M. P. 135° C.

1-p-aminophenoxy-5-cinnamoylaminopentane, M. P. 117–118° C.

Example XXII

A mixture of 1-p-methylaminophenoxy-5-phthalimidopentane (3.38 g.), n-propyl iodide (5.1 g.) and sodium carbonate (0.53 g.) in ethanol (20 ml.) was refluxed for 20 hours, cooled, diluted with ether and filtered. Recrystallisation of the solid from ethanol-ether gave 1-(N-methyl-p-n-propylaminophenoxy)-5-phthalimidopentane n-propiodide, M. P. 147–150° C. This quaternary salt (2.5 g.) was heated at 15 mm. pressure until no more volatile iodide was evolved. The residue was extracted with ether, which was filtered and evaporated, giving 1-(N - methyl-p - n - propylaminophenoxy)-5-phthalimidopentane as a yellow oil. The methiodide had M. P. 140–141° C. depressed to 135–140° C. on admixture with the original n-propiodide.

Example XXIII 2-chloroethyl chloroformate (0.79 g.) and sodium acetate trihydrate (1.02 g.) were added successively to a suspension of 1-p-amino-phenoxy-5-benzamidopentane (1.49 g.) in water (50 ml.) and acetic acid (0.3 g.). After 4 days at room temperature, the mixture was filtered and the solid was washed with water, then crystallised successively from ethanol and chloroform, giving 1-p-(2-chloroethoxycarbonamidophenoxy)-5-benzamidopentane, M. P. 155–157° C.

The foregoing compound (0.5 g.) was added to a solution of sodium hydroxide (0.3 g.) in water (0.5 ml.), ethanol (1 ml.) and 2-ethoxyethanol (1 ml.), which was then refluxed for 15 minutes, cooled, diluted with water and filtered. Recrystallisation of the product from aqueous ethanol gave 1-p-2-hydroxyethylaminophenoxy-5-benzamidopentane, M. P. 92–95° C.

Example XXIV

A mixture of 1-p-nitrophenoxy-5-aminopentane (28 g.) and homophthalic acid (22.4 g.) was heated at 180–190° C. for 2.5 hours, cooled, triturated with ethanol, and filtered. The solid product was recrystallised from acetone, giving 1-p-nitrophenoxy-5-homophthalimido-pentane, M. P. 144–145° C. The foregoing nitro compound (18.4 g.) in methanol (200 ml.) was reduced by hydrogen over Raney nickel at 98° C./300 lb. per sq. in. The filtered solution was treated with methanesulphonic acid (5 ml.) giving 1-p-aminophenoxy-5-homophthalimido-pentane methanesulphonate, M. P. 178–189° C.

Example XXV

A mixture of 1-p-nitrophenoxy-5-aminopentane (45 g.) and methylsalicylate (15.2 g.) was heated at 120° C. for 5 hours, then cooled and dissolved in chloroform, which was washed with 2 N hydrochloric acid and water, dried and evaporated. The residue, which solidified on trituration with light petroleum (B. P. 40–60° C.), was recrystallised from benzene, yielding 1-p-nitrophenoxy-5-o-hydroxybenzamidopentane, M. P. 123–125° C.

Redistilled ethyl chloroformate (12 g.) was slowly added to a cooled solution of the above nitro compound (35 g.) in dry pyridine (120 ml.). The mixture was heated for 2 hours at 100° C., cooled, and diluted with water. The solid product was filtered off and recrystallised from acetic acid and from ethanol, giving N-(5-p-nitrophenoxypentyl)-5:6-benzoxazine-2:4-dione, M. P. 145–146° C. Catalytic reduction of this nitro compound (21.4 g.) in dimethylformamide (150 ml.) over Raney nickel yielded N - (5 - p - amino-phenoxypentyl) 5:6-benzoxazine-2:4-dione, M. P. 136–138° C.

Example XXVI 2-phenyloxazolene (8.6 g.) was added to a solution of 1-p-nitrophenoxy-5-aminopentane (12.0 g.) in chloroform. The solution was evaporated and the residue was heated for 30 minutes at 100° C. Crystallisation of the residue from ethanol gave 1-p-nitrophenoxy-5-hippuramidopentane, M. P. 145–147° C., raised by recrystallisation from acetone to 149° C. Catalytic reduction of this nitro compound (as described in Example I) afforded 1-p-aminophenoxy-5-hippuramidopentane, M. P. 119–121° C.

Example XXVII 1-p-nitrophenoxy-5-bromopentane (28.8 g.) was added to a solution of 1-p-nitrophenoxy-5-aminopentane (22.4 g.) in chloroform. The solution was evaporated. The residue was dissolved in ethanol (250 ml.) and the solution was refluxed for 20 hours, cooled and filtered. The hydrobromide (34.6 g.), which separated, was shaken with benzoyl chloride (20 ml.) in acetone (100 ml.) and 2 N sodium hydroxide (250 ml.). The benzoyl derivative was filtered off, washed with water and ethanol, recrystallised from acetone-ether at 80° C., the product (M. P. 114–115.5° C.) was reduced catalytically as described in Example I, and the filtered solution was treated with methane sulphonic acid, giving N-benzoyl di-(5-p-aminophenoxypentyl)amine dimethanesulphonate, M. P. 137–139° C.

Example XXVIII

A solution of toluene-p-sulphonyl chloride (45 g.) in dry pyridine (80 ml.) was added dropwise to a solution of hex-3-ene-1:6-diol (25 g.) in dry pyridine (100 ml.), stirred and cooled to −40° C. After 1 hour the temperature was slowly allowed to rise and the solution was stirred for 24 hours, at room temperature. Pyridine (160 ml.) was distilled off in a high vacuum and the residue was treated with ice and concentrated hydrochloric acid. After saturation of the mixture with sodium chloride, extraction with chloroform gave 1-toluene-p-sulphonyloxyhex-3-ene-6-ol as an oil. A mixture of this oil (38 g.) and potassium phthalimide (50 g.) in 2-ethoxyethanol (400 ml.) was heated at 100° C. for 24 hours, the mixture was cooled, diluted with chloroform and filtered, and the filtrate was concentrated in vacuo. The residue was taken up in chloroform again, the solution was washed with water, cold N sodium hydroxide, water again, dried and evaporated. The residue was extracted with boiling water (2×1.5 l.) and the aqueous extract was cooled and extracted with chloroform, which was dried and evaporated. The residual oil solidified on treatment with light petroleum (B. P. 40–60° C.). Recrystallisation from dilute ethanol gave 1-phthalimido-6-hydroxyhex-3-ene, M. P. 65–66° C.

Recrystallised toluene p-sulphonyl chloride (0.93 g.) was added to a solution of the above compound (1 g.) in dry pyridine (4 ml.) at 10–20° C. After 1.5 hour water was added and the crystalline product was recrystallised from ethanol, yielding 1-p-phthalimido-6-toluene-p-sulphonyloxyhex-3-ene, M. P. 109–110° C.

This ester (3.2 g.) was added to a solution of sodium (0.22 g.) and p-acetamidophenol (1.8 g.) in ethanol (70 ml.) and the mixture was refluxed for 6 hours, solvent was distilled off, water was added, and the solid product was filtered off, washed with N sodium hydroxide and water, and recrystallised from methanol, giving 1-phthalimido-6-p-acetamidophenoxyhex-3-ene, M. P. 136–137° C.

The foregoing acetyl derivative (16.4 g.) in acetic acid (200 ml.) was refluxed with a solution of methanesulphonic acid (4.6 g.) in water (30 ml.) for 48 hours. Acetic acid was removed under reduced pressure at 60°, the residue was treated with warm water and filtered, and the filtrate was treated with methanesulphonic acid and cooled. The crystalline product was filtered off and recrystallised from ethanol, giving 1-p-aminophenoxy-6-phthalimidohex-3-ene methanesulphonate, M. P. 207–209° C.

Example XXIX

N-acetyl-p-methylaminophenol (28.9 g.) and 5-phthalimidopentyl bromide (51.8 g.) were added to a solution of sodium (4.03 g.) in ethanol (100 ml.) and the mixture was refluxed for 20 hours, diluted with water and extracted with chloroform. The washed and dried extract was evaporated and the residue was crystallised from chloroform-ether, giving N-acetyl 1-p-methylaminophenoxy-5-phthalimidopentane, M. P. 83–85° C.

This acetyl derivative (44.3 g.) was refluxed with 80% hydrazine hydrate (8 ml.) in ethanol (100 ml.) for 3 hours, the solvent was distilled off, and the residue was treated with cold N hydrochloric acid and filtered using Hyflo Supercel. The filter cake was further extracted with hot water. The combined filtrates were made strongly alkaline with 50% sodium hydroxide and extracted with chloroform. The washed and dried extract was evaporated, the residue was dissolved in pyridine and treated with benzoyl chloride (18.3 g.), yielding N-acetyl 1-p-methylaminophenoxy-5-benzamidopentane which, after recrystallisation from acetone-light petroleum (B. P. 40–60° C.) had M. P. 110–112° C.

A solution of the foregoing compound (16.25 g.) in acetic acid (50 ml.) and 2 N hydrochloric acid (23 ml.) was refluxed for 48 hours, the solution was evaporated in vacuo, and the residue was dissolved in warm dilute methanesulphonic acid and extracted with warm chloroform to remove non-basic material. The aqueous solution was made alkaline and the solid product was filtered off and recrystallised from aqueous ethanol, giving 1-p-methylaminophenoxy-5-benzamidopentane, M. P. 91–92° C.

Example XXX

Tetraethyl pyrophosphite (2.7 ml.) was added to a solution of 1-p-nitrophenoxy-5-aminopentane (2.24 g.) and p-acetamidobenzoic acid (1.79 g.) in diethyl phosphite (7 ml.) and the mixture was heated on the steam bath for 1 hour, then diluted with water and cooled. The crystalline product was filtered off, washed with water, and recrystallised from 2-ethoxyethanol, yielding 1-p-nitrophenoxy - 5 - p - acetamidobenzamidopentane, M. P. 187–188° C. Catalytic reduction of this nitro compound as described in Example I gave 1-p-aminophenoxy-5-p-acetamidobenzamidopentane, M. P. 173.5–174.5° C.

*Example XXXI*

Benzoyl chloride (6.1 g.) was added to a solution of 1-p-nitrophenoxy-5-aminopentane (2.54 g.) in pyridine (10 ml.) and the mixture was refluxed for 1.5 hour, diluted with water and cooled. The product was filtered off and recrystallised from ethanol, giving 1-p-nitro-phenoxy-5-dibenzoylaminopentane, M. P. 119–120° C. Catalytic reduction of this nitro compound, as described in Example I, yielded 1-p-aminophenoxy-5-dibenzoyl-aminopentane, M. P. 92–93° C.

*Example XXXII*

1-p-nitrophenoxy-5 - (2:4-dichlorophenoxy)acetamidopentane, M. P. 112–114° C. and 1-p-nitrophenoxy-5-phthalimidoacetamidopentane, M. P. 183.5–185° C. were prepared by the method of Example III. Catalytic reduction yielded 1-p-aminophenoxy-5-(2:4-dichlorophenoxy)-acetamidopentane, M. P. 104.5–106.5° C., and 1-p-aminophenoxy-5-phthalimidoacetamidopentane, M. P. 156.5–158.5° C., respectively.

*Example XXXIII*

A mixture of 1-p-nitrophenoxy-5-aminopentane (22.7 g.) and glutaric anhydride (11.6 g.) was heated at 100° C. for 30 minutes, then crystallised from ethanol, giving 1-p-nitrophenoxy-5-4'-carboxybutyramidodpentane, M. P. 116–117° C. This acid (37.3 g.) was refluxed with acetyl chloride (100 ml.) for 20 minutes, excess of acetyl chloride was distilled off, and the residue was crystallised from methanol, giving 1-p-nitrophenoxy-5-glutarimidopentane, M. P. 87–88° C. Catalytic reduction of this nitro compound by the method of Example I yielded 1-p-aminophenoxy-5-glutarimidopentane, M. P. 109° C.

It is particularly to be noted that the present invention is concerned only with compounds in which A in the general formula contains at least 5 carbon atoms. It has been found that in the compounds having fewer carbon atoms in A the activity falls off sharply. This is illustrated by the following data:

"Mice were infected intraperitoneally with cerceriae of S. mansoni (80–120 per mouse). After 7–8 weeks they were treated daily for four days by mouth with an aqueous solution or suspension of the drugs. The mice were killed and examined 7–14 days after the end of treatment and compared with infected controls from the same batch of animals. If no living worms were found in a treated mouse it was considered to be cured."

The compounds used were of the formula

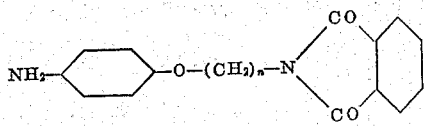

and one prior compound 1-phenoxy-5-phthalimidopentane was included as a comparison compound.

The following results were obtained:

| n | Daily Dose, mg./g. | Total No. of mice | Total No. of worms | Worms in Portal Vein (PV) | Worms in Mesenteric Vein (MV) | PV/MV | Ave. No. worms, mouse | Standard error | Acute oral toxicity |
|---|---|---|---|---|---|---|---|---|---|
| 2 | 0.25 | 10 | 51 | 15 | 36 | 0.5 | 5.1 | ±1.2 | 0.8 |
| Control | 0 | 13 | 88 | 35 | 53 | 0.7 | 6.7 | ±2 | |
| 3 | 0.4 | 10 | 64 | 21 | 43 | 0.5 | 6.4 | ±1 | 1.5 |
| Control | 0 | 13 | 88 | 35 | 53 | 0.7 | 6.7 | ±2 | |
| 4 | 1 | 10 | 74 | 38 | 36 | 1 | 7.4 | ±3 | >4 |
| Control | | 15 | 217 | 142 | 75 | 1.9 | 14 | ±2.5 | |
| 5 | 1 | 9 | 0 | 0 | 0 | | 0 | | >4 |
| Control | | 15 | 136 | 55 | 81 | 0.6 | 9 | ±1.8 | |
| 6 | 1 | 10 | 0 | 0 | 0 | | 0 | | >4 |
| Control | | 10 | 33 | 14 | 19 | 0.7 | 3.3 | ±.8 | |
| 7 | 1 | 10 | 0 | 0 | 0 | | 0 | | 4.0 |
| Control | | 9 | 159 | 87 | 72 | 1.2 | 17.6 | ±2 | >4 |
| 8 | 1 | 10 | 0 | 0 | 0 | | 0 | | >4 |
| Control | | 10 | 33 | 14 | 19 | 0.7 | 3.3 | ±.8 | |
| 9 | 1 | 11 | 38 | 19 | 19 | 1 | 3.5 | ±1.8 | >4 |
| Control | | 15 | 217 | 142 | 75 | 1.9 | 14.5 | ±2.5 | |

COMPARISON COMPOUND

| | | | | | | | | | |
|---|---|---|---|---|---|---|---|---|---|
| | 1 | 8 | 60 | 39 | 21 | 1.8 | 7.5 | ±2.1 | >4 |
| Control | | 12 | 217 | 121 | 96 | 1.2 | 18.1 | ±4.9 | |

In the above table the column headed Average No. of worms per mouse shows the activity of the test compound. The toxicity value $LD_{50}$ is the dose in milligrams per gram of mouse causing the death of 50% of the mice so that the lower values indicate higher toxicity. In fact the first two compounds listed in the table ($n$ being 2 or 3) are so toxic that they had to be administered in smaller doses than the others.

It will therefore be seen from the table that a "cure" in the sense of elimination of all worms, is not effected until $n$ is at least 5 and further that the comparison compound, despite its similarity of structure, is of no value.

We claim:

1. A compound selected from the class consisting of:
(1) compounds of the general formula:

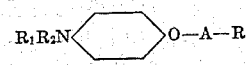

where $R_1$ and $R_2$ are each selected from the class consisting of the hydrogen atom and alkyl, hydroxyalkyl, dihydroxyalkyl and 2-methoxyethyl groups, where the alkyl residue contains at most 4 carbon atoms, A is a hydrocarbon chain selected from the class consisting of unbranched saturated and ethylenically unsaturated hydrocarbon chains containing not less than 5 and not more than 9 carbon atoms, and R is a group selected from the class consisting of groups of the formulae

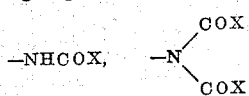

and

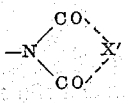

where X is selected from the class consisting of (a) phenyl and naphthyl radicals and said radicals containing halogen, lower alkoxy, carboxy, carbamoyl, and lower alkyl carboxylic acylamido substituents, (b) alkyl and alkenyl groups of not more than 3 carbon atoms and said alkyl and alkenyl groups containing phenyl, phenoxy, amino, carboxylic, and lower alkyl carboxylic acylamido substituents, and (c) pyridyl, thienyl and furyl radicals, and where X' is selected from the class consisting of (a') groups of the formula

where Y is selected from the class consisting of a single bond, an oxygen atom and a —CH$_2$— group and Z is an ortho-linked benzene ring, (b') 1:2-linked wholly hydrocarbon alicylic rings, and (c') wholly hydrocarbon aliphatic chains of at most 3 carbon atoms, (2) their acid addition salts, and (3) their formaldehyde bisulphite addition compounds.

2. The compound 1-p-aminophenoxy - 5 - phthalimidopentane.

3. The compound 1-p-aminophenoxy - 6 - phthalimidohexane.

4. The compound 1-p-aminophenoxy-5-benzamidopentane.

5. The compound 1-p-aminophenoxy - 8 - benzamidooctane.

6. The compound 1-p-aminophenoxy-5-hippuramidopentane.

7. A therapeutic composition for the treatment of bilharziasis containing a compound as defined in claim 1 together with a pharmaceutical diluent compatible therewith.

8. A therapeutic composition for the treatment of bilharziasis containing a compound as defined in claim 2 together with a pharmaceutical diluent compatible therewith.

9. A therapeutic composition for the treatment of bilharziasis containing a compound as defined in claim 4 together with a pharmaceutical diluent compatible therewith.

10. A therapeutic composition for the treatment of bilharziasis containing a compound as defined in claim 6 together with a pharmaceutical diluent compatible therewith.

References Cited in the file of this patent
UNITED STATES PATENTS
2,552,241   Weissberger et al. _____ May 8, 1951

OTHER REFERENCES

Belotsvetov: Chem. Abstracts, vol. 39, col. 2287 (1945).

Matejka et al.: J. Chem. Soc. (London), vol. 1934, pp. 1322-6.